US008081940B2

(12) United States Patent
Rofougaran

(10) Patent No.: US 8,081,940 B2
(45) Date of Patent: Dec. 20, 2011

(54) METHOD AND SYSTEM FOR DYNAMICALLY TUNING AND CALIBRATING AN ANTENNA USING AN ON-CHIP DIGITALLY CONTROLLED ARRAY OF CAPACITORS

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 591 days.

(21) Appl. No.: 11/536,678

(22) Filed: Sep. 29, 2006

(65) Prior Publication Data

US 2008/0081581 A1 Apr. 3, 2008

(51) Int. Cl.
*H04B 1/16* (2006.01)

(52) U.S. Cl. ..................... 455/193.1; 455/121

(58) Field of Classification Search .................. 455/121, 455/123, 125, 193.1, 193.2, 193.3, 266, 269, 455/280, 290, 67.11, 115.1
See application file for complete search history.

(56) References Cited

U.S. PATENT DOCUMENTS

| 3,906,405 A * | 9/1975 | Kommrusch | 333/17.3 |
| 5,052,049 A * | 9/1991 | Andros et al. | 455/186.1 |
| 5,483,680 A * | 1/1996 | Talbot | 455/107 |
| 5,548,821 A * | 8/1996 | Coveley | 455/67.14 |
| 5,589,844 A * | 12/1996 | Belcher et al. | 343/860 |
| 6,590,538 B1 * | 7/2003 | Koyanagi et al. | 343/702 |
| 7,286,804 B2 * | 10/2007 | Miyagi et al. | 455/169.1 |
| 7,295,822 B2 * | 11/2007 | Sano | 455/181.1 |
| 2004/0198298 A1 * | 10/2004 | Waight et al. | 455/333 |
| 2005/0266811 A1 | 12/2005 | Weiss | |
| 2006/0281423 A1 * | 12/2006 | Caimi et al. | 455/129 |
| 2010/0267350 A1 * | 10/2010 | Kasha et al. | 455/121 |

FOREIGN PATENT DOCUMENTS

| KR | 20010078104 | 8/2001 |
| KR | 20030006051 | 1/2003 |
| WO | W02006029082 | 3/2006 |

\* cited by examiner

*Primary Examiner* — Blane J Jackson
(74) *Attorney, Agent, or Firm* — McAndrews, Held & Malloy, Ltd.

(57) ABSTRACT

Methods and systems for dynamically tuning and calibrating an antenna using on-chip digitally controlled array of capacitors are disclosed. Aspects of one method may include dynamically tuning a mobile terminal antenna (MTA) using on-chip arrays of capacitive devices. The tuning may be, for example, to compensate for center frequency drift during operation of the mobile terminal. The tuning may be accomplished by selecting capacitive devices in the on-chip arrays of capacitive devices to use in conjunction with an inductive circuit coupled to the MTA, where the inductive circuit may be either off the chip or on the chip. Accordingly, an impedance of the circuit formed by the capacitive devices in the on-chip arrays of capacitive devices and the inductive circuit may be adjusted with respect to the MTA. A valid circuit configuration may include a configuration where no capacitive device may be selected for use with the inductive circuit.

37 Claims, 5 Drawing Sheets

METHOD AND SYSTEM FOR DYNAMICALLY TUNING AND CALIBRATING AN ANTENNA USING AN ON-CHIP DIGITALLY CONTROLLED ARRAY OF CAPACITORS

CROSS-REFERENCE TO RELATED APPLICATIONS/INCORPORATION BY REFERENCE

This application makes reference to:
U.S. application Ser. No. 11/536,682, filed on Sep. 29, 2006;
U.S. application Ser. No. 11/536,650, filed on Sep. 29, 2006;
U.S. application Ser. No. 11/536,644, filed on Sep. 29, 2006;
U.S. application Ser. No. 11/536,676, filed on Sep. 29, 2006;
U.S. application Ser. No. 11/536,659, filed on Sep. 29, 2006;
U.S. application Ser. No. 11/536,673, filed on Sep. 29, 2006;
U.S. application Ser. No. 11/536,679, filed on Sep. 29, 2006;
U.S. application Ser. No. 11/536,670, filed on Sep. 29, 2006;
U.S. application Ser. No. 11/536,672, filed on Sep. 29, 2006;
U.S. application Ser. No. 11/536,648, filed on Sep. 29, 2006;
U.S. application Ser. No. 11/536,669, filed on Sep. 29, 2006;
U.S. application Ser. No. 11/536,666, filed on Sep. 29, 2006;
U.S. application Ser. No. 11/536,675, filed on Sep. 29, 2006;
U.S. application Ser. No. 11/536,685, filed on Sep. 29, 2006;
U.S. application Ser. No. 11/536,645, filed on Sep. 29, 2006;
U.S. application Ser. No. 11/536,655, filed on Sep. 29, 2006;
U.S. application Ser. No. 11/536,660, filed on Sep. 29, 2006;
U.S. application Ser. No. 11/536,657, filed on Sep. 29, 2006;
U.S. application Ser. No. 11/536,662, filed on Sep. 29, 2006;
U.S. application Ser. No. 11/536,688, filed on Sep. 29, 2006, which issued as U.S. Pat. No. 7,634,246 on Dec. 15, 2009;
U.S. application Ser. No. 11/536,667, filed on Sep. 29, 2006;
U.S. application Ser. No. 11/536,651, filed on Sep. 29, 2006, which issued as U.S. Pat. No. 7,570,965 on Aug. 4, 2009;
U.S. application Ser. No. 11/536,656, filed on Sep. 29, 2006; and
U.S. application Ser. No. 11/536,663, filed on Sep. 29, 2006.

The above stated applications are hereby incorporated herein by reference in their entirety

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for dynamically tuning and calibrating an antenna using an on-chip digitally controlled array of capacitors.

BACKGROUND OF THE INVENTION

Wireless devices have used antennas to receive RF signals. The size of an antenna may depend on the wavelength of the RF signals that the wireless device is designed to receive. Typically, larger antennas are needed for signals with larger wavelengths. Accordingly, a mobile terminal may use antennas of a few inches for signals in the GHz range. However, for FM radio signals in the 100 MHz range, the antennas may need to be longer. As corded headsets gained in popularity with mobile terminal users, many mobile terminal manufacturers used the headphone cord as an antenna, for example, for a FM receiver However, with the advent of Bluetooth headsets, the need for corded headsets was eliminated. The mobile terminal manufacturers have devised alternate means for implementing an FM antenna. One such antenna comprises a conductive coil or loop on a small circuit board that is typically placed at the back of the mobile terminal Since this small FM antenna is limited in size, the antenna may be tuned to support the FM radio bandwidth. Additionally, because of the circuit board antenna's limited ability to receive FM signals, external factors may be a big factor to reception sensitivity. For example, a mobile terminal user holding the mobile terminal may cause the designed center frequency of the FM antenna to shift due to capacitive and/or inductive changes. Additionally, the mobile terminal's components, such as, the battery, may interfere with reception and/or change the antenna characteristics of the circuit board antenna by distorting and/or shorting the circuit board antenna.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for dynamically tuning and calibrating an antenna using an on-chip digitally controlled array of capacitors, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for dynamically tuning and calibrating an antenna using an on-chip digitally controlled array of capacitors. Aspects of the method may comprise dynamically tuning a mobile terminal antenna using at least one on-chip array of capacitive devices The tuning may be utilized, for example, to compensate for center frequency drift during operation of the mobile terminal The tuning may be accomplished by selecting capacitive devices in the on-chip arrays of capacitive devices to use in conjunction with an inductive circuit coupled to the mobile terminal antenna, where the inductive circuit may be either off the chip or on the chip. Accordingly, an impedance of the circuit formed by the capacitive devices in the on-chip arrays of capacitive devices and the inductive circuit may be adjusted with respect to the mobile terminal antenna. A valid circuit configuration may comprise a configuration in which no capacitive device may be selected for use with the inductive circuit.

The capacitive devices in the on-chip arrays of capacitive devices may be dynamically selected in order to select a desired center frequency for the mobile terminal antenna. The selection of the capacitive devices may be based on determining a frequency offset of the center frequency of the mobile terminal antenna from the desired center frequency. The impedance of a circuit comprising the capacitive devices in the on-chip arrays of capacitive devices may also be adjusted to select a specified bandwidth and/or to match the mobile terminal antenna to a RF front end. The impedance adjustment may be, for example, based on a measured signal strength and/or bit error rate of signals received by the mobile terminal.

Figure 1:
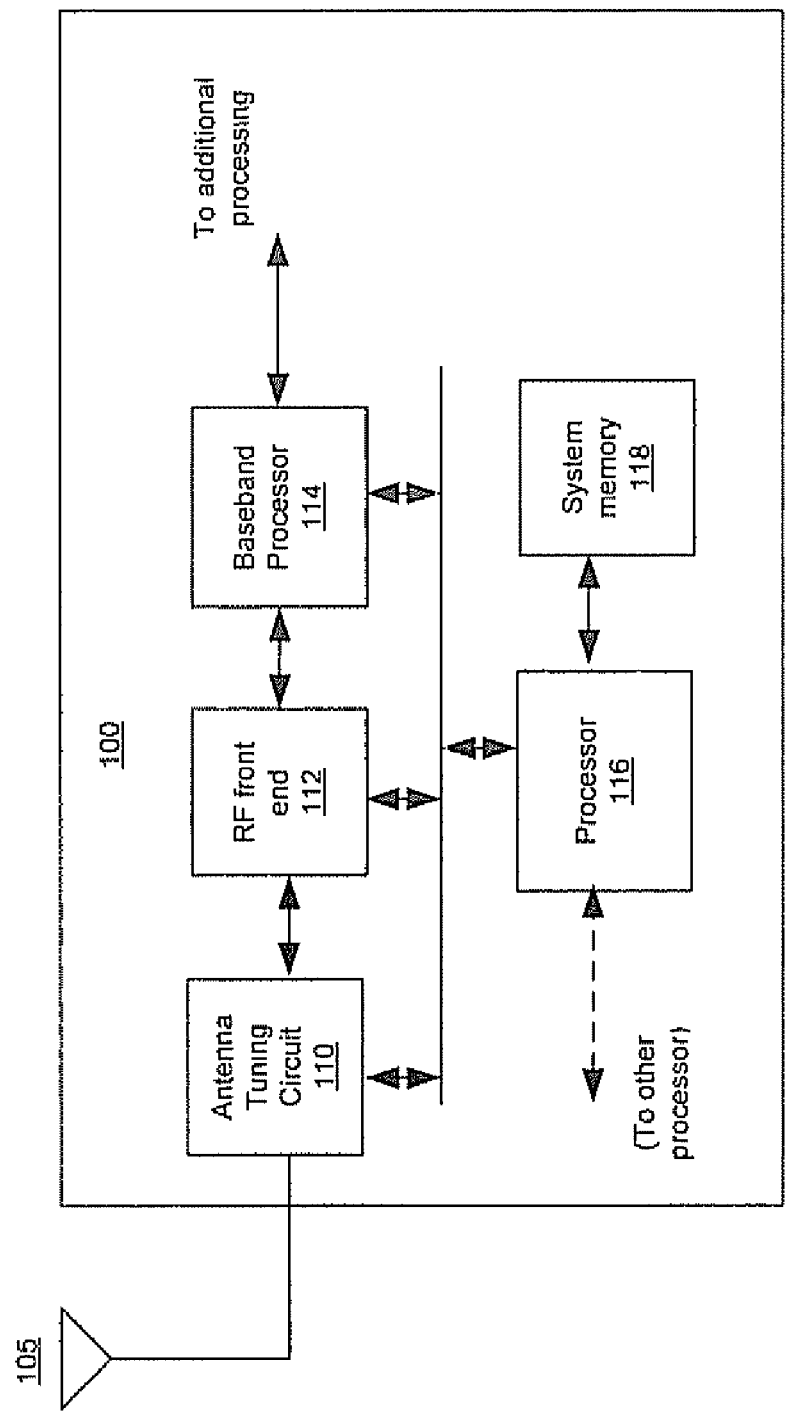
FIG. 1 is a block diagram of an exemplary mobile terminal, in accordance with an embodiment of the invention.

FIG, 1 is a block diagram of an exemplary mobile terminal, in accordance with an embodiment of the invention. Referring to FIG. 1, there is shown a mobile terminal 100, which may comprise, for example, an antenna 105, an antenna tuning circuit block 110, a RF front end 112, a baseband processor 114, a processor 116, and a system memory 118. The antenna tuning circuit block 110 may comprise suitable logic, circuitry, and/or code that may be adapted to adjust a center frequency for the antenna 105. The antenna tuning circuit block 110 may also adjust a bandwidth of signals that may be received by the antenna 105. The antenna tuning circuit block 110 may also adjust impedance matching between the antenna 105 and the RF front end 112.

The RF front end 112 may comprise suitable logic, circuitry, and/or code that may be adapted to process received RF signals and/or RF signals to be transmitted. The RF front end 112 may be coupled to the antenna 105 via the antenna tuning circuit 110 for signal reception and/or transmission. With respect to received signals, the RF front end 112 may demodulate the received signals before further processing. Moreover, the RF front end 112 may comprise other exemplary functions, such as, filtering the received signal, amplifying the received signals, and/or downconverting the received signals to very low intermediate frequency (VLIF) signal and/or baseband signal. The RF front end 112 may comprise an IF processor which may digitize an IF signal, and digitally process the digitized IF signal to filter and/or downconvert the digitized IF signal to a digital baseband signal. The IF processor may then convert the digitized baseband signal to an analog baseband signal.

The RF front end 112 may also receive digital or analog baseband signals from, for example, the baseband processor 114. For example, the baseband processor 114 may generate one or more signals that may be communicated to the RF front end 112, which may be utilized to control one or more functions executed by the RF front 112. Accordingly, in one embodiment of the invention, one or more signals generated by the baseband processor 114 and/or processor 116 may be utilized to program various components such as, for example, filters, phase lock loops (PLLs) or synthesizers, in the RF front end 112. The RF front end 112 may appropriately filter, amplify, and/or modulate an analog signal for transmission via the antenna 105. The RF front end 112 may also convert a digital signal to an analog signal as part of processing for transmission.

The baseband processor 114 may comprise suitable logic, circuitry, and/or code that may be adapted to process analog or digital baseband signals generated by the RF front end 112. The baseband processor 114 may also communicate baseband signals to the RF front end 112 for processing before transmission. The processor 116 may comprise suitable logic, circuitry, and/or code that may be adapted to control the operations of the antenna tuning circuit 110, the RF front end 112, and/or the baseband processor 114. For example, the processor 116 may be utilized to update and/or modify programmable parameters and/or values in a plurality of components, devices, and/or processing elements in the antenna tuning circuit 110, the RF front end 112, and/or the baseband processor 114. Exemplary programmable parameters may comprise gain of an amplifier, bandwidth of a filter, and/or PLL parameters. Control and/or data information may be transferred from another controller and/or processor in the mobile terminal 100 to the processor 116. Similarly, the processor 116 may transfer control and/or data information to another controller and/or processor in the mobile terminal 100.

The processor 116 may utilize the received control and/or data information to determine the mode of operation of the RF front end 112. For example, the processor 116 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 118 via the controller/processor 116. This information stored in system memory 118 may be transferred to the RF front end 112 from the system memory 118 via the controller/processor 116. The system memory 118 may comprise suitable logic, circuitry, and/or code that may be adapted to store a plurality of control and/or data information, including parameters needed to calculate frequencies and/or gain, and/or the frequency value and/or gain value.

In operation, RF signals may be communicated to the antenna tuning circuit 110 by the antenna 105. The antenna tuning circuit 110 may present an impedance to the antenna 105, and accordingly, the antenna 105 in conjunction with the antenna tuning circuit 110 may have a center frequency and a bandwidth about the center frequency. Accordingly, the antenna 105 may present optimal reception for those signals within the bandwidth. However, various environmental conditions, including the presence of the human body such as a user's hand holding onto the mobile terminal 100, may cause the center frequency to drift from the desired center frequency. For example, the inductive or capacitive characteristics of the human hand may change the center frequency whenever the hand comes in contact with the mobile terminal. The mobile terminal 100 may detect the center frequency drift and may dynamically configure the antenna tuning circuit block 110 in order to bring the center frequency closer to a desired center frequency. The antenna tuning circuit block 110 may also be configured to adjust the bandwidth of the antenna 105 and/or the impedance matching of the antenna 105 to the RF front end 112.

The center frequency drift may be detected, for example, by the REF front end 112, which may receive weaker signals at the desired frequencies. The center frequency drift may also be detected, for example, by processing the received signals. For example, if the received signals comprise digital information, the baseband processor 114 may detect an increase in bit error rate, which may be indicative of center frequency drift.

The signal strength indication and/or bit error rate may be communicated to the processor 116, and the processor 116 may determine that the antenna tuning circuit block 110 may need to be reconfigured. Accordingly, the processor 116 may communicate appropriate control and/or data to the antenna tuning circuit block 110 to reconfigure and/or retune the antenna tuning circuit block 110. By processing information regarding the received signals, the processor 116 may dynamically adjust the center frequency in order to reduce the effects of center frequency drift.

An embodiment of the invention may have been described with the antenna tuning circuit block 110 as a separate functional block, however, the invention need not be so limited. For example, the antenna tuning circuit block 110 may be part of the RF front end 112. Also, while the processor 116 may have been described as determining when and how to configure the antenna tuning circuit 110, the invention need not be so limited. For example, the antenna tuning circuit block 110 may comprise functionality that may adjust the center frequency and/or the bandwidth of the antenna 105, and/or the impedance matching of the antenna 105 to the RF front end 112 independently of, or in conjunction with, the processor 116. Additionally, while FIG. 1 may have been described as communicating to at least one other processor or controller, the invention need not be so limited. Accordingly, there may be instances when the processor 116 may not have to communicate with other processors in controlling RF communications. For example, a design of the mobile terminal may not utilize other processors than the processor 116 or the processor 116 may have access to all information needed to control RF communications.

Figure 2A:
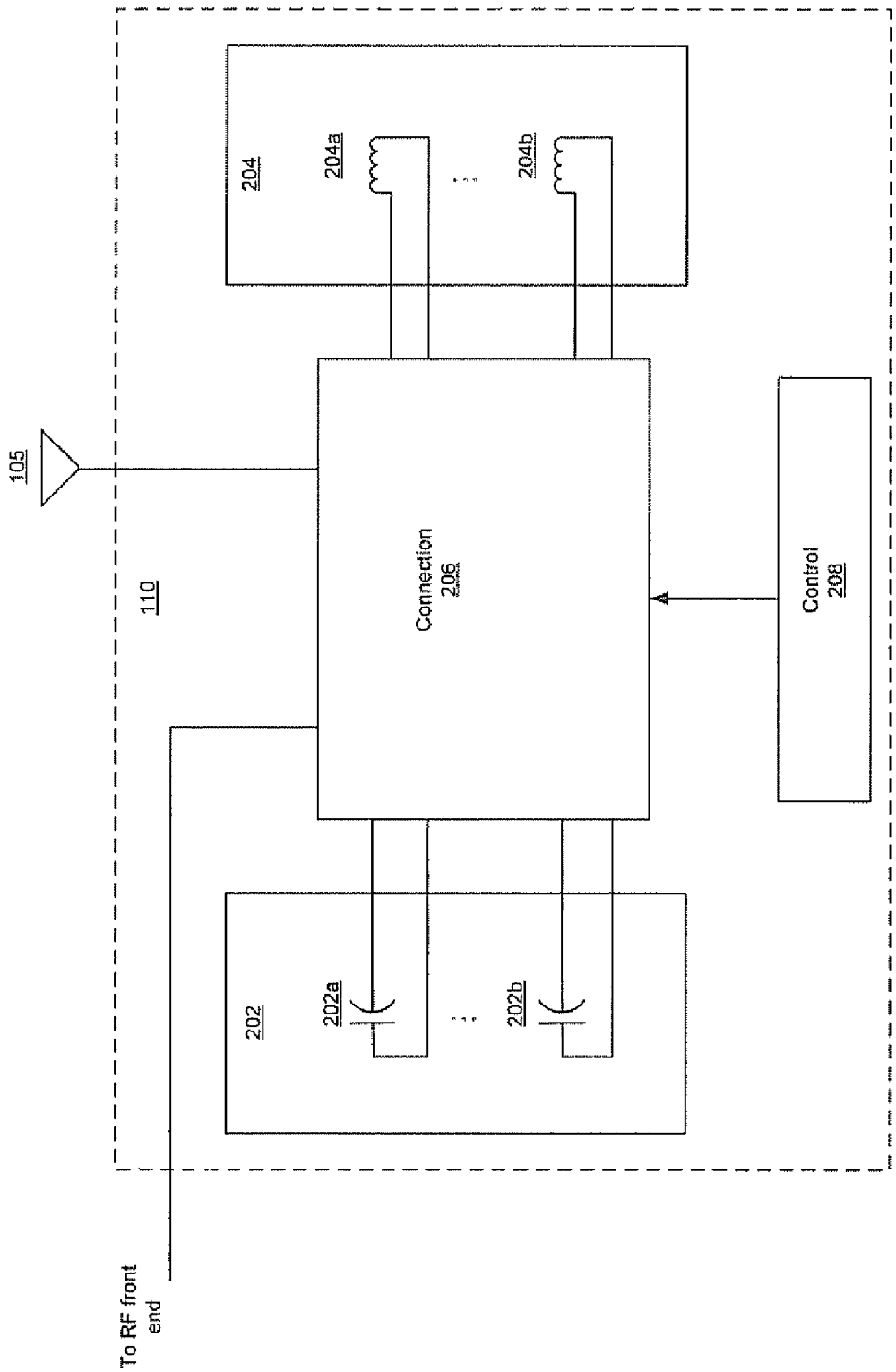
FIG. 2A is a block diagram illustrating an exemplary circuit that may be utilized for dynamically tuning and calibrating an antenna, in accordance with an embodiment of the invention.

FIG. 2A is a block diagram illustrating an exemplary circuit that may be utilized for dynamically tuning an antenna, in accordance with an embodiment of the invention. Referring to FIG. 2A, there is shown a capacitive device block 202, an inductive device block 204, a connection block 206, and a control block 208. The capacitive device block 202 may comprise a plurality of capacitive devices 202a ... 202b. Terminals of each capacitive device 202a ... 202b may be coupled to the connection block 206, The inductive device block 204 may comprise a plurality of inductive devices 204a ... 204b. Terminals of each inductive device 204a ... 204b may be coupled to the connection block 206.

The connection block 206 may comprise suitable logic, circuitry, and/or code that may enable coupling of any input terminal from the capacitive device block 202, the inductive device block 204, the antenna 105, and/or the connection to the RF front end to be connected to any terminal from the capacitive device block 202, the inductive device block 204, the antenna 105, and/or the connection to the RF front end 112. Accordingly, the connection block 206 may configure a subset of the capacitive devices 202a ... 202b and a subset of the inductive devices 204a ... 204b to form a circuit that couples the terminal from the antenna 105 and the connection to the RF front end 112. For example, the subset may be a null subset to form a short circuit between the terminal from the antenna 105 and the connection to the RF front end 112. The subset of the capacitive devices 202a ... 202b may also be a subset that comprises the set of capacitive devices 202a ... 202b. Similarly, the subset of the inductive devices 204a ... 204b may be a subset that comprises the set of inductive devices 204a ... 204b. Accordingly, the subset of capacitive devices 202a ... 202b may range from no capacitive device to all of the capacitive devices 202a ... 202b in capacitive device block 202. Similarly, the subset of inductive devices 204a ... 204b may range from no inductive device to all of the inductive devices 204a ... 204b in inductive device block The control block 208 may comprise suitable logic, circuitry, and/or code that may enable configuration of a capacitive device and/or inductive device circuit that may be used to receive an RF signal from the antenna 105. The received RF signal may be communicated to the RF front end 112.

The capacitive device and/or inductive device circuit may be configured via the connection block 206, where control signals from the control block 208 may indicate connection of the various terminals for the capacitive devices 202a ... 202b, the inductive devices 204a ... 204b, the antenna 105, and/or connection to the RF front end 112. In some embodiments of the invention, the capacitive device block 202 may be on the same chip as the inductive device block 204. In other embodiments of the invention, the inductive device block 204 may be located separately from the on-chip capacitive device block 202.

In operation, the control block 208 may receive data and/or commands from the processor 116. The control block 208 may then send appropriate commands to the connection block 206 in order to configure the capacitive devices 202a ... 202b and/or the inductive devices 204a ... 204b to a particular circuit and connect the circuit to the terminal from the antenna 105 and to the connection to the RF front end 112. For example, the control block 208 may communicate signals to the connection block 206 such that the connection block 206 may couple the capacitive device 202a in parallel to the inductive device 204a. First and second terminals of the resulting LC parallel circuit may be coupled to the antenna 105 and to the RF front end 112, respectively. Accordingly, the impedance of the circuit formed by the inductive devices 204a ... 204b and the capacitive devices 202a ... 202b may be changed with different circuit configurations. A change in the impedance of the circuit formed by the inductive devices 204a ... 204b and the capacitive devices 202a ... 202b may result in a shift in the center frequency of the antenna 105, a change in the bandwidth of the antenna 105, and/or change in the impedance matching of the antenna 105 to the RF front end 112.

Figure 2B:
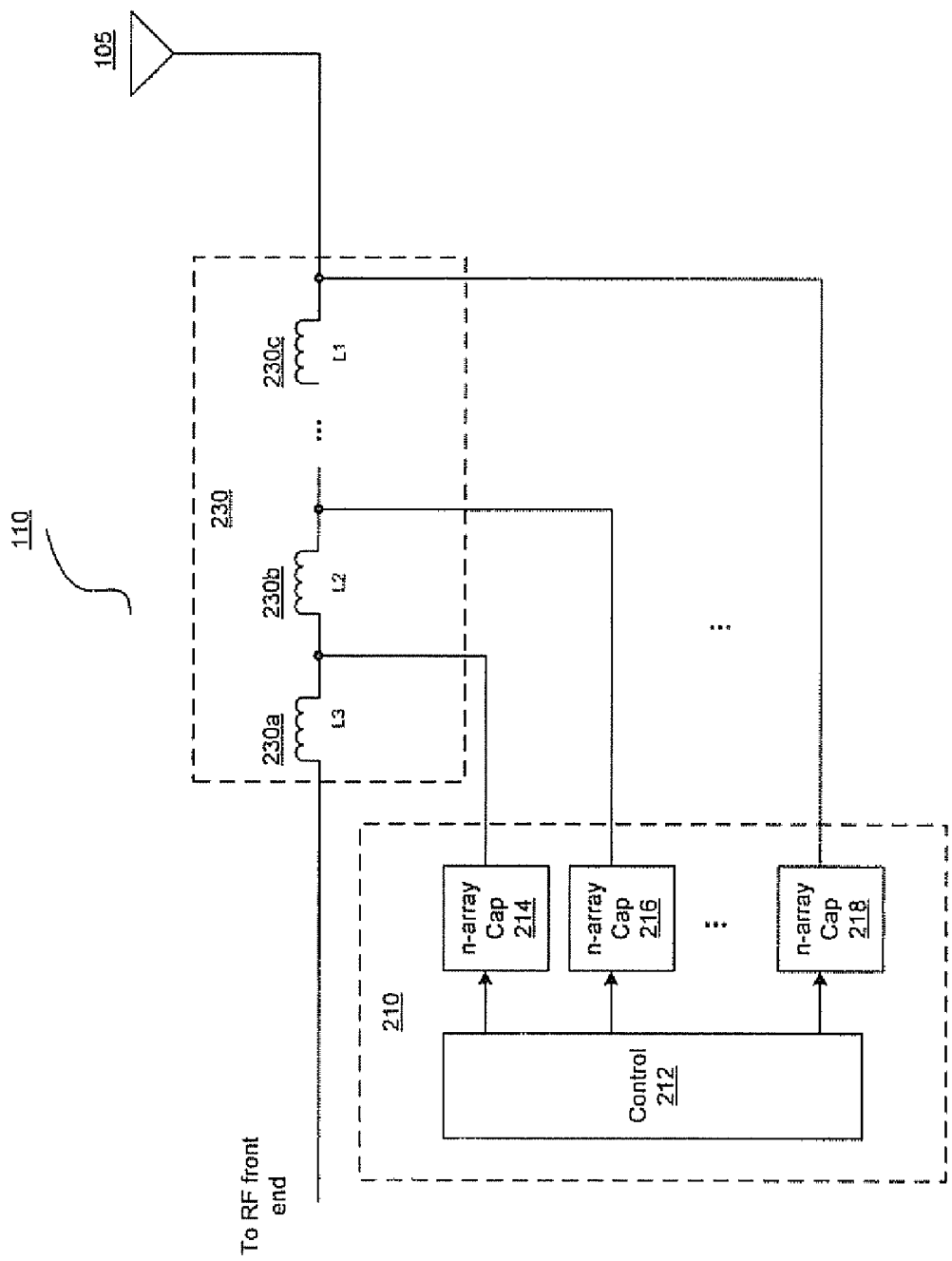
FIG. 2B is a block diagram illustrating an exemplary inductive circuit block that may be utilized for dynamically tuning an antenna, in accordance with an embodiment of the invention.

FIG. 2B is a block diagram illustrating an exemplary inductive circuit block that may be utilized for dynamically tuning an antenna, in accordance with an embodiment of the invention. Referring to FIG. 2B, in an embodiment of the invention, the antenna tuning circuit block 110 may comprise a tuning control block 210 and an inductive circuit block 230. The tuning control block 210 may comprise a control block 212 and a plurality of capacitor arrays 214, 216, . . . 218. The control block 212 may comprise suitable logic, circuitry, and/or code that may enable control of capacitance that may be associated with each of the capacitor arrays 214, 216, . . . 218. In some embodiments of the invention, the capacitor arrays 214, 216, . . . 218 may be on the same chip as the inductive circuit block 220. In other embodiments of the invention, the inductive circuit block 220 may be located separately from the on-chip capacitor arrays 214, 216, . . . 218.

The capacitor arrays 214, 216, . . . 218 may each comprise a plurality of capacitive elements whose capacitances may be added to effectively form different capacitors with different capacitances. The capacitor array 214, 216, or 218 is described in more detail with respect to FIG. 2C. The inductive circuit block 220 may comprise a plurality of inductive elements that may be coupled to the capacitor arrays 214, 216, . . . 218.

The inductive circuit block 230 illustrates an exemplary configuration for the inductive elements of the inductive circuit block 220. The inductive circuit block 230 may comprise a plurality of inductive elements 230a, 230b, . . . 230c in series. Each of the capacitor arrays 214, 216, . . . , 218 may be coupled to a node in the inductive circuit block 230. For example, the capacitor array 214 may be coupled to the node between the inductors 230a and 230b, the capacitor array 216 may be coupled to the node between the inductors 230b and 230c, and the capacitor array 218 may be coupled to the node of the inductor 230c that is not coupled to the inductor 230b.

In operation, the tuning control block 210 may configure the capacitive arrays 214, 216, . . . 218 for use with the inductive circuit block 230. The control block 212 may select a capacitance for each of the capacitive arrays 214, 216, . . . , 218 by enabling individual capacitive elements to be used for receiving RF signals from the antenna 105. Accordingly, the impedance of the circuit may be varied, and thereby cause the center frequency and/or the bandwidth associated with the antenna 105, and/or impedance matching between the antenna 105 and the RF front end 112 may be adjusted.

While the inductive devices 230a, 230b, . . . , 230c in the inductive circuit block 230 may have been described as being in series, the invention need not be so limited. The inductive devices 230a, 230b, . . . , 230c may be placed in other configurations, such as, for example, parallel, a pi, or star configuration, as well as any combination of serial, parallel, pi, or star configurations.

Figure 2C:
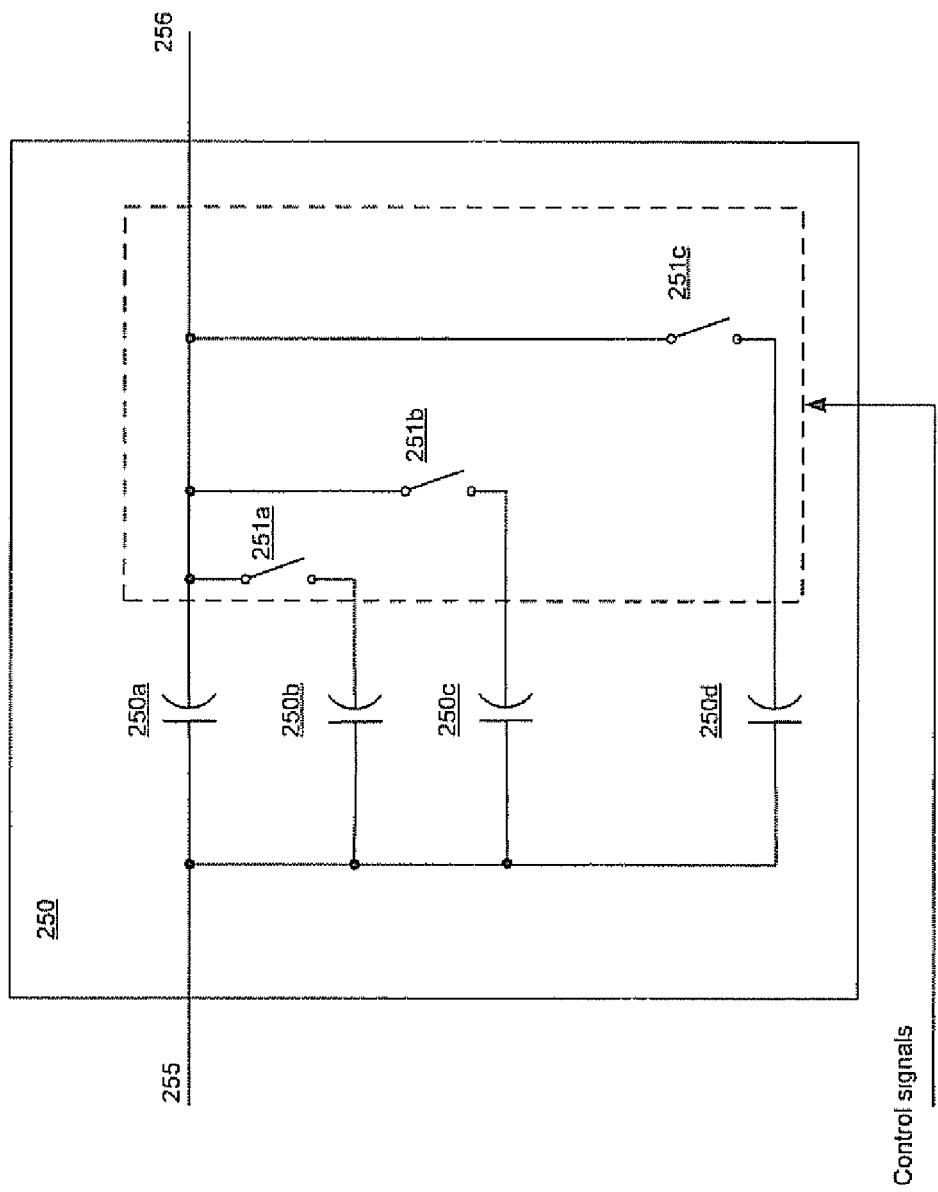
FIG. 2C is a block diagram illustrating an exemplary n-array capacitor block that may be utilized for dynamically tuning an antenna, in accordance with an embodiment of the invention.

FIG. 2C is a block diagram illustrating an exemplary n-array capacitor block that may be utilized for dynamically tuning an antenna, in accordance with an embodiment of the invention. Referring to FIG. 2C, there is shown the capacitive array 250, which may be similar to the capacitive arrays 214, 216, . . . , 218. The capacitive array 250 may comprise the capacitive elements 250a, 250b, 250c, . . . 250d, the switches 251a, 251b, . . . , 251c, and the output nodes 255 and 256.

The control block 212 may control whether each of the switches 251a, 251b, . . . , 251c may be open or closed via the control signals to the capacitive array 250. In instances where a switch may be open, the corresponding capacitive element 250b, 250c, . . . , 250d, respectively, may not be part of a circuit that receives the RF signals from the antenna 105. Conversely, in instances where a switch may be closed, the corresponding capacitive element may be part of the circuit that receives the RF signals. Accordingly, the impedance of the circuit that receives the RF signals may be adjusted by opening or closing the switches 251a, 251b, . . . , 251c. Adjusting the impedance in this manner may adjust the center frequency and/or the bandwidth of the antenna 105, and/or the impedance matching of the antenna 105 to the RF front end 112.

The control block 212 may receive one or more signals, for example, from the processor 116, which may indicate a status of the center frequency drift for the antenna 105. The received signal from the processor 116 may comprise, for example, detailed information regarding switch positions for each capacitive array 214, 216, . . . , 218. Accordingly, the control block 212 may only need nominal processing to open or close the various switches 251a, 251b, . . . , 251c in the capacitive arrays 214, 216, . . . , 218. Other embodiments of the invention may communicate signal integrity indicators, for example, received signal strength indication and/or bit error rate, to the control block 212. The control block 212 may then process the signal integrity indicators to determine the center frequency drift, and proper adjustments that may be needed to compensate for the drift. The control block 212 may then open or close the various switches 251a, 251b, . . . , 251c in the capacitive arrays 214, 216, . . . , 218 to adjust the center frequency and/or the bandwidth of the antenna 105, and/or the impedance matching of the antenna 105 to the RF front end 112. Still other embodiments of the invention may allocate processing between the processor 116 and the control block 212. For example, the processor 116 may determine the amount of drift or shift in the center frequency, while the control block 212 may determine a specific configuration for the capacitive arrays 214, 216, . . . , 218 based on the amount of frequency compensation needed.

While the capacitive devices 250a, 250b, . . . , 250d in the capacitive array 250 may have been described as being in parallel, the invention need not be so limited. The capacitive devices 250a, 250b, . . . , 250d may be placed in other configurations, such as, for example, in parallel, in a pi, or star configuration, as well as any combination of serial, parallel, pi, or star configuration. Additionally, while the capacitive element 250a may be shown always connected, other embodiments of the invention may allow the capacitive element 250a to be switched. Accordingly, the capacitive array 250 may be configured so that it may not be part of the circuit receiving the RF signals from the antenna 105. Notwithstanding its configuration, the capacitive array 250 may have the capability to dynamically switch the amount of capacitance that may be required to tune the center frequency to a desired value.

Additionally, FIG. 2B may indicate that the capacitive arrays 214, 216, . . . , 218 may be coupled to fixed nodes of the inductive circuit block 230. However, the invention need not be so limited. For example, the terminals 255 and 256 of the capacitive array 250 may be programmably coupled to different locations. Accordingly, in one exemplary configuration, the capacitive array 214 may couple the terminal 255 to ground and the terminal 256 to the node between the inductive devices 230a and 230b. In another exemplary configuration, the capacitive array 214 may couple the terminal 255 to the node connected only to the inductive device 230a and the terminal 256 to the node between the inductive devices 230a and 230b.

Figure 3:
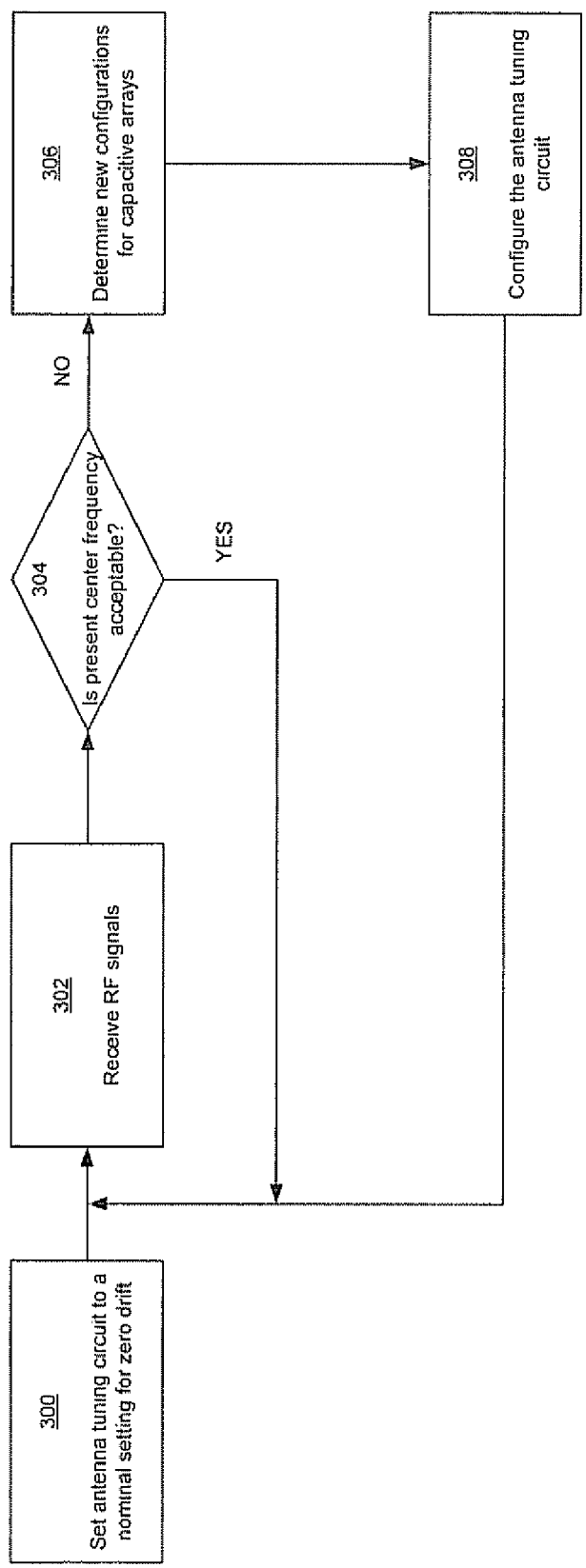
FIG. 3 is an flow diagram of exemplary steps for dynamically tuning an antenna, in accordance with an embodiment of the invention

FIG. 3 is an flow diagram of exemplary steps for dynamically tuning an antenna, in accordance with an embodiment of the invention. Referring to FIG. 3, there is shown exemplary steps 300 to 308. In step 300, the antenna tuning circuit block 110 may be at a nominal configuration where the center frequency for the antenna 105 may be at the desired frequency. In step 302, the mobile terminal 100 may receive desired RF signals via the antenna 105. The mobile terminal 100 may determine whether the center frequency may have drifted by, for example, processing the present received signal strength level compared to previous signal strength levels. If the signal strength is decreasing, one reason may be because the center frequency may have drifted. For digital broadcasts, the mobile terminal 100 may also determine whether a trend for bit error rates is increasing or decreasing. If the bit error rate is increasing, one reason may be because the center frequency may have drifted.

Accordingly, the mobile terminal 100 may determine whether to adjust the center frequency. If so, the next step may be step 302, where the mobile terminal 100 may operate without adjusting the center frequency and/or the bandwidth of the antenna 105, and/or the impedance matching between the antenna 105 and the RF front end 112. If the center frequency is to be adjusted, the next step may be step 306 In step 306, the processor 116 and the control block 212 may determine how to configure the capacitive arrays 214, 216, . . . , 218 to move the center frequency toward the desired nominal center frequency of step 300. In step 308, the various switches 251a, 251b, . . . , 251c in the capacitive arrays 214, 216, . . . , 218 may be opened or closed to configure the antenna tuning circuit 110 to adjust the center frequency and/or the bandwidth of the antenna 105, and/or the impedance matching between the antenna 105 and the RF front end 112 appropriately. The next step may be step 302.

In accordance with an embodiment of the invention, aspects of an exemplary system may comprise an antenna tuning circuit block 110 that enables dynamically tuning of the antenna 105. The antenna tuning circuit block 110 may comprise the capacitive arrays 214, 216, . . . , 218 of capacitive devices to compensate for center frequency drift during operation of the mobile terminal. The impedance due to the capacitive arrays 214, 216, . . . 218 and the inductive circuit block 230 coupled to the antenna 105 may be adjusted to adjust the center frequency and/or bandwidth of the antenna 105, and/or the impedance matching between the antenna 105 and the RF front end 112. The tuning control block 210 may adjust the impedance by dynamically selecting capacitive devices in the capacitive arrays 214, 216, . . . , 218 to operate to receive the RF signals from the antenna 105. The capacitive arrays 214, 216, . . . , 218 may be on a chip, while the inductive circuit block 230 may be on the same chip or not.

The selection of the capacitive devices in the capacitive arrays 214, 216, . . . , 218 may be based on a determination of a frequency offset from the desired center frequency. The frequency offset may be determined by, for example, the processor 116. If the center frequency needs to be adjusted, the processor 116 may indicate to the tuning control block 210 the appropriate capacitive elements to be used in the capacitive arrays 214, 216, . . . , 218. The tuning control block 210 may also adjust the impedance due the capacitive arrays 214, 216, . . . 218 and the inductive circuit block 230 coupled to the antenna 105 by appropriately configuring the capacitive arrays 214, 216, . . . , 218 to select a specified bandwidth. The tuning control block 210 may also adjust the impedance due the capacitive arrays 214, 216, . . . 218 and the inductive circuit block 230 to impedance match the antenna 105 to the RF front end 112. The tuning control block 210 may adjust the impedance based on a measured signal strength and/or the bit error rate of signals received via the antenna 105.

Another embodiment of the invention may provide a machine-readable storage, having stored thereon, a computer program having at least one code section executable by a machine, thereby causing the machine to perform the steps as described above for dynamically tuning and calibrating an antenna using on-chip digitally controlled array of capacitors. In various exemplary embodiments of the invention, any one or more of: the antenna tuning circuit 100, the RF front end 112, the baseband processor 114, and the processor 116, may be controlled by software and/or firmware.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for wireless communication, the method comprising:
generating in a mobile terminal, a control signal based on an indication of signal quality of a received signal;
compensating for center frequency drift of said mobile terminal by dynamically tuning, using said generated control signal, an impedance coupled to an antenna of said mobile terminal using at least one of a plurality of on-chip arrays of capacitive devices, wherein each of said at least one of said plurality of on-chip arrays of capacitive devices is coupled to a terminal of an inductive circuit coupled to said mobile terminal antenna; and
configuring a bandwidth by adjusting said impedance coupled to said mobile terminal antenna.

2. The method according to claim 1, wherein said inductive circuit is off said chip.

3. The method according to claim 1, wherein said inductive circuit is on said chip.

4. The method according to claim 1, comprising dynamically selecting capacitive devices in said at least one on-chip array of capacitive devices to select a desired center frequency for said mobile terminal antenna.

5. The method according to claim 4, comprising determining a frequency offset from said desired center frequency.

6. The method according to claim 5, comprising adjusting said at least one of said plurality of on-chip arrays of capacitive devices based on said determining.

7. The method according to claim 1, comprising adjusting said impedance based on a measured signal strength of signals received via said mobile terminal antenna.

8. The method according to claim 1, comprising adjusting said impedance based on a bit error rate of signals received via said mobile terminal antenna.

9. The method according to claim 1, wherein said indication of signal quality of said received signal comprises one or both of a signal-to-noise ratio of said received signal and a bit error rate of said received signal.

10. The method according to claim 1, wherein said generating of said control signal is based on a trend associated with said indication of signal quality of said received signal.

11. A method for wireless communication, the method comprising:
generating in a mobile terminal, a control signal based on an indication of signal quality of a received signal;
compensating for center frequency drift of said mobile terminal by dynamically tuning, using said generated control signal, an impedance coupled to an antenna of said mobile terminal by configuring a first subset of a plurality of on-chip arrays of capacitive devices with a second subset of inductive devices, wherein said each of said plurality of on-chip arrays of capacitive devices is coupled to a terminal of an inductive circuit coupled to said mobile terminal; and
configuring a bandwidth by adjusting said impedance coupled to said mobile terminal antenna.

12. A machine-readable storage having stored thereon, a computer program having at least one code section for wireless communication, the at least one code section being executable by a machine for causing the machine to perform steps comprising:
generating in a mobile terminal, a control signal based on an indication of signal quality of a received signal;
compensating for center frequency drift of said mobile terminal by dynamically tuning, using said generated control signal, an impedance coupled to an antenna of a said mobile terminal using at least one of a plurality of on-chip arrays of capacitive devices, wherein each of said at least one of said plurality of on-chip arrays of capacitive devices is coupled to a terminal of an inductive circuit coupled to said mobile terminal antenna; and
configuring a bandwidth by adjusting said impedance coupled to said mobile terminal antenna.

13. The machine-readable storage according to claim 12, wherein said inductive circuit is off said chip.

14. The machine-readable storage according to claim 12, wherein said inductive circuit is on said chip.

15. The machine-readable storage according to claim 12, wherein said at least one code section comprises code for dynamically selecting capacitive devices in said at least one of a plurality of on-chip arrays of capacitive devices to select a desired center frequency for said mobile terminal antenna.

16. The machine-readable storage according to claim 15, wherein said at least one code section comprises code for determining a frequency offset of center frequency of said mobile terminal antenna from said desired center frequency.

17. The machine-readable storage according to claim 16, wherein said at least one code section comprises code for adjusting said at least one of said plurality of on-chip arrays of capacitive devices based on said determining.

18. The machine-readable storage according to claim 12, wherein said at least one code section comprises code for adjusting said impedance coupled to said antenna based on a measured signal strength of signals received via said mobile terminal antenna.

19. The machine-readable storage according to claim 12, wherein said at least one code section comprises code for adjusting said impedance based on a bit error rate of signals received via said mobile terminal antenna.

20. The machine-readable storage according to claim 12, wherein said indication of signal quality of said received signal comprises one or both of a signal-to-noise ratio of said received signal and a bit error rate of said received signal.

21. The machine-readable storage according to claim 12, wherein said generating of said control signal is based on a trend associated with said indication of signal quality of said received signal.

22. A system for wireless communication, the system comprising:
control circuitry that enables:
generation of a control signal based on an indication of signal quality of a received signal; and
compensating for center frequency drift of a mobile terminal by dynamically tuning, using said generated control signal, an impedance coupled to an antenna of said mobile terminal using at least one of a plurality of on-chip arrays of capacitive devices, wherein each of said at least one of said plurality of on-chip arrays of capacitive devices is coupled to a terminal of an inductive circuit coupled to said mobile terminal; and
configuration of a bandwidth by adjusting said impedance coupled to said mobile terminal antenna.

23. The system according to claim 22, wherein said inductive circuit is off said chip.

24. The system according to claim 22, wherein said inductive circuit is on said chip.

25. The system according to claim 22, wherein said control circuitry enables dynamically selecting capacitive devices in said at least one of a plurality of on-chip arrays of capacitive devices to select a desired center frequency for said mobile terminal antenna.

26. The system according to claim 25, comprising processing circuitry that enables determination of a frequency offset from said desired center frequency.

27. The system according to claim 26, wherein said control circuitry enables adjustment of said at least one of a plurality of on-chip arrays of capacitive devices based on said determining by said processing circuitry.

28. The system according to claim 22, wherein said control circuitry enables adjustment of said impedance based on a measured signal strength of signals received via said mobile terminal antenna.

29. The system according to claim 22, wherein said control circuitry enables adjustment of said impedance based on a bit error rate of signals received via said mobile terminal antenna.

30. The system according to claim 22, wherein said indication of signal quality of said received signal comprises one or both of a signal-to-noise ratio of said received signal and a bit error rate of said received signal.

31. The system according to claim 22, wherein said control circuitry enables generation of said control signal based on a trend associated with said indication of signal quality of said received signal.

32. A system for communicating information in a wireless communication system, the system comprising:
- at least one circuit comprising a plurality of on-chip arrays of capacitive devices and a plurality of inductive circuits;
- said at least one circuit enables generation of a control signal based on an indication of signal quality of a received signal;
- said at least one circuit enables dynamically controlling, using said generated control signal, a frequency of received RF signal to compensate for center frequency drift;
- said at least one circuit enables dynamic configuration of at least one antenna that receives said RF signal;
- said at least one circuit enables configuring a bandwidth by adjusting an impedance coupled to at least one antenna.

33. A method for wireless communication, the method comprising:
- generating in a mobile terminal, a control signal based on an indication of signal quality of a received signal;
- compensating for center frequency drift of said mobile terminal by dynamically tuning, using said generated control signal, an impedance coupled to an antenna of said mobile terminal using at least one of a plurality of on-chip arrays of capacitive devices, wherein each of said at least one of said plurality of on-chip arrays of capacitive devices is coupled to a terminal of an inductive circuit coupled to said mobile terminal antenna; and
- configuring bandwidth of signals communicated via said mobile terminal antenna by adjusting said impedance coupled to said mobile terminal antenna.

34. A method for wireless communication, the method comprising:
- generating in a mobile terminal, a control signal based on an indication of signal quality of a received signal;
- compensating for center frequency drift of said mobile terminal by dynamically tuning, using said generated control signal, an impedance coupled to an antenna of said mobile terminal by configuring a first subset of a plurality of on-chip arrays of capacitive devices with a second subset of inductive devices, wherein said each of said plurality of on-chip arrays of capacitive devices is coupled to a terminal of an inductive circuit coupled to said mobile terminal; and
- configuring bandwidth of signals communicated via said mobile terminal antenna by adjusting said impedance coupled to said mobile terminal antenna.

35. A machine-readable storage having stored thereon, a computer program having at least one code section for wireless communication, the at least one code section being executable by a machine for causing the machine to perform steps comprising:
- generating in a mobile terminal, a control signal based on an indication of signal quality of a received signal;
- compensating for center frequency drift of said mobile terminal by dynamically tuning, using said generated control signal, an impedance coupled to an antenna of a said mobile terminal using at least one of a plurality of on-chip arrays of capacitive devices, wherein each of said at least one of said plurality of on-chip arrays of capacitive devices is coupled to a terminal of an inductive circuit coupled to said mobile terminal antenna; and
- configuring bandwidth of signals communicated via said mobile terminal antenna by adjusting said impedance coupled to said mobile terminal antenna.

36. A system for wireless communication, the system comprising:
- control circuitry that enables:
  - generation of a control signal based on an indication of signal quality of a received signal; and
  - compensating for center frequency drift of a mobile terminal by dynamically tuning, using said generated control signal, an impedance coupled to an antenna of said mobile terminal using at least one of a plurality of on-chip arrays of capacitive devices, wherein each of said at least one of said plurality of on-chip arrays of capacitive devices is coupled to a terminal of an inductive circuit coupled to said mobile terminal; and
  - configuration of bandwidth of signals communicated via said mobile terminal antenna by adjusting said impedance of said mobile terminal antenna.

37. A system for communicating information in a wireless communication system, the system comprising:
- at least one circuit comprising a plurality of on-chip arrays of capacitive devices and a plurality of inductive circuits;
- said at least one circuit enables generation of a control signal based on an indication of signal quality of a received signal;
- said at least one circuit enables dynamically controlling, using said generated control signal, a frequency of received RF signal to compensate for center frequency drift;
- said at least one circuit enables dynamic configuration of at least one antenna that receives said RF signal; and
- said at least one circuit enables configuration of bandwidth of signals communicated via said mobile terminal antenna by adjusting an impedance coupled to at least one antenna.

* * * * *